US012173487B2

(12) United States Patent
Mead

(10) Patent No.: US 12,173,487 B2
(45) Date of Patent: Dec. 24, 2024

(54) FLOW DISPERSION DEVICE

(71) Applicant: Kohler Mira Limited

(72) Inventor: Richard Mead, Cheltenham (GB)

(73) Assignee: KOHLER MIRA LIMITED, Cheltenham (GB)

( * ) Notice: Subject to any disclaimer, the term of this patent is extended or adjusted under 35 U.S.C. 154(b) by 0 days.

(21) Appl. No.: 16/905,165

(22) Filed: Jun. 18, 2020

(65) Prior Publication Data

US 2020/0318328 A1 Oct. 8, 2020

Related U.S. Application Data

(63) Continuation of application No. PCT/GB2018/053326, filed on Nov. 16, 2018.

(30) Foreign Application Priority Data

Dec. 21, 2017 (GB) ...................................... 1721663

(51) Int. Cl.
*E03C 1/04* (2006.01)
*B05B 1/18* (2006.01)
(Continued)

(52) U.S. Cl.
CPC .............. *E03C 1/0408* (2013.01); *B05B 1/18* (2013.01); *B05B 15/65* (2018.02); *E03C 1/055* (2013.01); *B01F 35/71* (2022.01)

(58) Field of Classification Search
CPC ......... E03C 1/0408; E03C 1/055; B05B 1/18; B05B 15/65; B05B 15/00; B01F 15/02
See application file for complete search history.

(56) References Cited

U.S. PATENT DOCUMENTS 8,424,779 B2 * 4/2013 Li .......................... B05B 1/1609 239/289
8,893,320 B2 * 11/2014 Klicpera ............... G01F 15/024 4/615
(Continued)

FOREIGN PATENT DOCUMENTS

CA 2969339 A1 * 12/2017
CN 106216113 A 12/2016
(Continued)

OTHER PUBLICATIONS

International Search Report and Written Opinion, PCT/GB2018/053326, Kohler Mira Limited (Feb. 28, 2019).
(Continued)

*Primary Examiner* — Qingzhang Zhou
(74) *Attorney, Agent, or Firm* — Husch Blackwell LLP

(57) ABSTRACT

A flow dispersion device for use with an ablutionary fitting having an outlet providing a water stream includes a coupling mechanism arranged to removably couple the flow dispersion device to the ablutionary fitting such that, when coupled, the flow dispersion device is arranged to disperse the water stream into a water spray. The flow dispersion device further includes a data storage medium arranged to store computer readable information defining one or more spray characteristics, wherein the data storage medium is readable by the ablutionary fitting to control the water spray according to the one or more stored spray characteristics. An ablutionary fitting and a set of dispersion devices is also disclosed.

20 Claims, 3 Drawing Sheets

(51) Int. Cl.

| | |
|---|---|
| ***B05B 15/65*** | (2018.01) |
| ***E03C 1/05*** | (2006.01) |
| *B01F 35/71* | (2022.01) |

(56) References Cited

U.S. PATENT DOCUMENTS

| | | | | |
|---|---|---|---|---|
| 2006/0186215 | A1* | 8/2006 | Logan | E03C 1/055 236/12.2 |
| 2010/0213282 | A1 | 8/2010 | Peel et al. | |
| 2011/0225724 | A1 | 9/2011 | Bronstein | |
| 2012/0261496 | A1* | 10/2012 | Lev | B05B 1/1636 239/443 |
| 2013/0232684 | A1 | 9/2013 | Schumacher et al. | |
| 2016/0129464 | A1 | 5/2016 | Frommer | |
| 2016/0258144 | A1* | 9/2016 | Tayenaka | G05D 27/02 |
| 2017/0050201 | A1* | 2/2017 | Deivasigamani | A61B 5/6887 |
| 2017/0128960 | A1 | 5/2017 | D'Urso et al. | |

FOREIGN PATENT DOCUMENTS

| | | |
|---|---|---|
| CN | 106667326 A | 5/2017 |
| CN | 107081237 | 8/2017 |
| CN | 107262301 | 10/2017 |
| CN | 107450403 | 12/2017 |
| DE | 30 50 226 | 2/1985 |
| DE | 10 2013 115 006 | 7/2015 |
| JP | 2005-146551 | 6/2005 |
| KR | 201200287 | 3/2012 |
| WO | WO-2008/103330 A1 | 8/2008 |
| WO | WO-01/1106000 | 9/2011 |

OTHER PUBLICATIONS

UKIPO Combined Search and Examination Report, App. No. GB1721663.1, Kohler Mira Limited (Jun. 22, 2018).

European Office Action dated Jun. 7, 2022, issued in corresponding European application.

Chinese Office Action dated Jul. 21, 2022, issued in corresponding Chinese application.

United Kingdom Office Action dated Aug. 10, 2022, issued in corresponding United Kingdom application.

* cited by examiner

FLOW DISPERSION DEVICE

CROSS-REFERENCE TO RELATED PATENT APPLICATIONS

The present application is a Continuation of International Application No. PCT/GB2018/053326, filed Nov. 16, 2018, which claims priority to and the benefit of United Kingdom Priority Application 1721663.1, filed Dec. 21, 2017. The entire disclosures of International Application No. PCT/GB2018/053326 and United Kingdom Priority Application 1721663.1, including their specifications, drawings, claims, and abstracts, are incorporated herein by reference in their entireties.

BACKGROUND

This application relates to a flow dispersion device for use with an ablutionary fitting. In particular, this application relates to ablutionary fittings that provide sprays with controllable characteristics. More particularly, this application relates to showers or shower heads with controllable spray characteristics. This application also relates to a set of flow dispersion devices and an ablutionary fitting comprising the flow dispersion device.

SUMMARY

An exemplary embodiment relates to a flow dispersion device for use with an ablutionary fitting having an outlet providing a water stream. The flow dispersion device includes a coupling mechanism arranged to removably couple the flow dispersion device to the ablutionary fitting such that, when coupled, the flow dispersion device is arranged to disperse the water stream into a water spray. The flow dispersion device also includes a data storage medium arranged to store computer readable information defining one or more spray characteristics, wherein the data storage medium is readable by the ablutionary fitting to control the water spray according to the one or more stored spray characteristics.

Another exemplary embodiment relates to a set of flow dispersion devices that includes a first flow dispersion device and a second flow dispersion device. The first and second flow dispersion devices each comprise a coupling mechanism arranged to removably couple the flow dispersion device to an ablutionary fitting such that, when coupled, the flow dispersion device is arranged to disperse a water stream from the ablutionary fitting into a water spray. The first and second flow dispersion devices also each comprise a data storage medium arranged to store computer readable information defining one or more spray characteristics, wherein the data storage medium is readable by the ablutionary fitting to control the water spray according to the one or more stored spray characteristics. The data storage medium of the first dispersion device is arranged to store one or more spray characteristics corresponding to a first user experience and the data storage medium of the second dispersion device is arranged to store one of more spray characteristics corresponding to a different second user experience.

Another exemplary embodiment relates to an ablutionary fitting comprising a flow dispersion device. The ablutionary fitting includes an outlet arranged to provide a stream of water, a coupling mechanism arranged to removably couple to the flow dispersion device, and a data storage medium arranged to store computer readable information defining one or more spray characteristics. The ablutionary fitting also includes a reader arranged to read the computer readable information stored by the data storage medium, and a controller in communication with the reader, the controller arranged to control the water spray formed by the flow dispersion device according to the one or more stored spray characteristics.

BRIEF DESCRIPTION OF THE DRAWINGS

Various exemplary embodiments will now be described, by way of example only, with reference to the accompanying drawings, in which.

DETAILED DESCRIPTION

Figure 1:
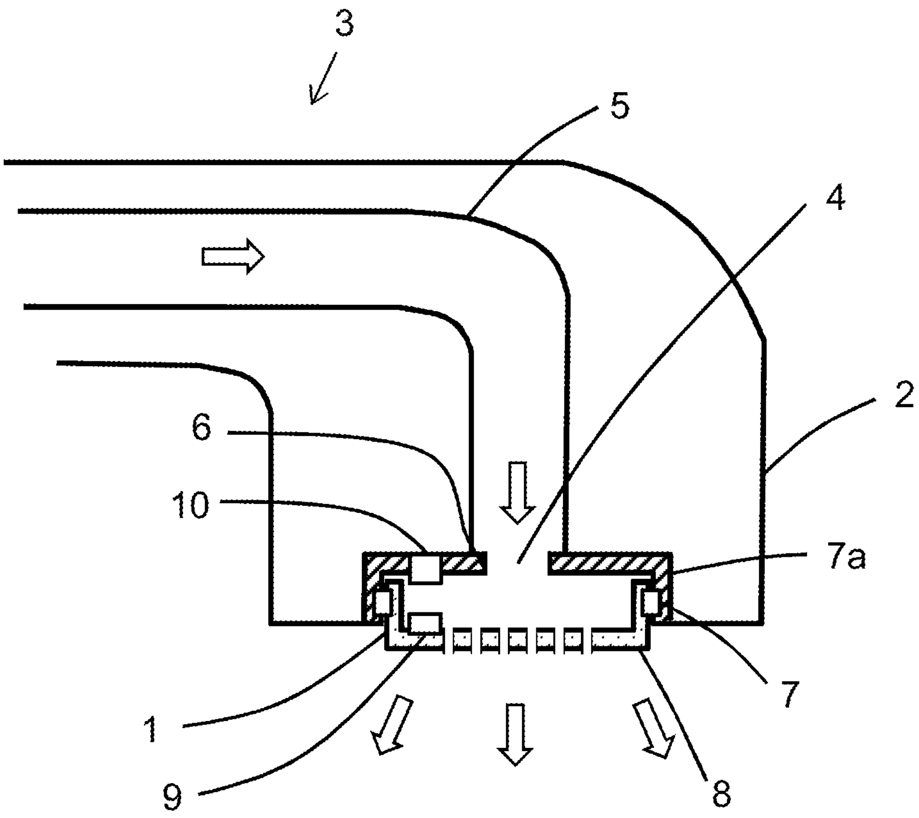
FIG. 1 shows a schematic cross section view of a flow dispersion device coupled to an ablutionary fitting according to an embodiment.

In order to provide improved user experience, an ablutionary fitting such as a shower may be arranged to generate a spray of water having controllable characteristics. The controllable characteristics may provide the user with different showering experiences varying from invigorating sports warm down showers to a soft and gentle morning waking-up shower. In order to create these shower experiences the flow rate, temperature and spray pattern provided by the shower head (or heads) may be varied between shower experiences, and may be varied over time within the duration of a single shower experience.

A first aspect provides a flow dispersion device for use with an ablutionary fitting having an outlet providing a water stream, the flow dispersion device comprising: a coupling mechanism arranged to removably couple the flow dispersion device to the ablutionary fitting such that, when coupled, the flow dispersion device is arranged to disperse the water stream into a water spray; and a data storage medium arranged to store computer readable information defining one or more spray characteristics, wherein the data storage medium is readable by the ablutionary fitting to control the water spray according to the one or more stored spray characteristics.

By providing a flow dispersion device having stored spray characteristics the user may conveniently program the ablutionary fitting to provide the desired user experience. By including the data storage medium on the dispersion device, the spray pattern produced by a particular dispersion device can be tailored to the one or more spray characteristics stored on that dispersion device.

The data storage medium may be arranged to communicate with a reader provided on the ablutionary fitting. This may allow the one or more spray characteristics to be obtained by the ablutionary fitting from the dispersion device.

The data storage medium may be arranged to form a wireless connection with the reader. This may avoid the need to form any electrical connection between the dispersion device and the ablutionary fitting.

The data storage medium may be positioned on the dispersion device such that the wireless connection is formed when the dispersion device is coupled to the ablutionary fitting. This allows the stored data to be transmitted from the dispersion device only when it has been coupled to the ablutionary fitting by the user.

The data storage medium may comprise an electronic data storage medium arranged to electronically store the one or more spray characteristics.

The data storage medium may comprise a near field communication (NFC) chip that is readable by an associated NFC reader provided on the ablutionary fitting.

The NFC chip may comprise a Radio Frequency Identification (RFID) tag.

The data storage medium may comprise a passive data storage device which may be wirelessly powered by the reader. This may reduce the number of electrical components required on the dispersion device.

The data storage medium may comprise a computer readable optical label and the reader may comprise an optical reader arranged to read the optical label.

The one or more spray characteristics may each define one or more desired properties of the water spray to define a desired user experience. This may allow the user to program the ablutionary fitting according to the desired experience.

The data storage medium may be pre-loaded with one or more spray characteristics corresponding to a certain predefined user experience. This may allow the user to choose a pre-set user experience having a pre-set complex variation in spray properties that would otherwise be time consuming to input.

The data storage medium may be programmable by the user to define the one or more spray characteristics such that they correspond to a desired user experience. This may allow greater user customizability.

The one or more spray characteristics may define properties of the water spray chosen from any one or more of: (i) the temperature of at least part of the water making up the water spray; (ii) the flow rate of at least part of the water making up the water spray; and (iii) the spray pattern of at least part of the water spray.

The one or more spray characteristics may define a time dependent change in a property of the water spray.

The one or more spray characteristics may define a sequence of varying water spray properties such that combinations of any one or more of the water temperature, water flow rate and spray pattern may be varied over time to create different user experiences.

The ablutionary fitting may comprise a controller arranged to receive the one or more spray characteristics, the controller being in communication with one or more components of the ablutionary fitting operable to change the properties of the water spray.

The components operable to change the properties of the water spray may include any one or more of: (i) a water source supplying water to the outlet; (ii) one or more nozzles provided at the outlet; and (iii) the dispersion device.

The ablutionary fitting may comprises a shower, and wherein the one or more spray characteristics may define a shower experience.

A second aspect provides a set of dispersion devices comprising: a first dispersion device according to the first aspect and a second dispersion device according to the first aspect, wherein the data storage medium of the first dispersion device is arranged to store one or more spray characteristics corresponding to a first user experience and wherein the data storage medium of the second dispersion device is arranged to store one or more spray characteristics corresponding to a different second user experience.

The set of dispersion devices may comprise one or more further dispersion devices, i.e. three or more dispersion devices. The data storage medium of each dispersion device may be arranged to store one or more spray characteristics of a user experience. Each user experience may be different from the other user experiences.

A third aspect provides an ablutionary fitting comprising a dispersion device according to the first aspect or a set of dispersion devices according to the second aspect, the ablutionary fitting comprising: an outlet arranged to provide a stream of water; a coupling mechanism arranged to removably couple to the dispersion device; a reader arranged to read the computer readable information stored by the data storage medium; and a controller in communication with the reader, where the controller is arranged to control the water spray formed by the dispersion device according to the one or more stored spray characteristics.

A fourth aspect provides a flow dispersion device for use with an ablutionary fitting having an outlet providing a water stream, the flow dispersion device comprising: a coupling mechanism arranged to removably couple the flow dispersion device to the ablutionary fitting such that, when coupled, the flow dispersion device is arranged to disperse the water stream into a water spray.

Providing a removably coupled dispersion device may have a number of different advantages. The dispersion device may be removed for more convenient cleaning. The removable dispersion device may allow the user to couple a customized dispersion device to the ablutionary fitting. The dispersion device may be tailored to the requirements of a specific user by providing a particular water spray (e.g. by providing a suitable arrangement of through holes to disperse the water into a desired spray pattern). Additionally or alternatively, the dispersion device may be tailored to the user by having a different visual appearance (e.g. having a different shape, color or surface material or pattern).

The coupling mechanism may be manually operated by the user. This may allow the user to replace the dispersion device with an alternative dispersion device or remove and replace it for cleaning without the use of tools. This may allow the ablutionary fitting to be quickly and conveniently cleaned or customized by the user.

A fifth aspect provides a set of dispersion devices comprising: a first dispersion device according to the fourth aspect and a second dispersion device according to the fourth aspect.

The first dispersion device may be associated with a first user and the second dispersion device may be associated with a second user.

The first dispersion device may be arranged to disperse the water stream into a first spray pattern and the second dispersion device may be arranged to disperse the water stream into a different second spray pattern.

The first dispersion device may have a first user characteristic and the second dispersion device may have a different second user characteristic. The user characteristic may correspond to the visual appearance of the dispersion device. The user characteristic may correspond to any or more of the shape, color, surface pattern and material of the dispersion device.

The set of dispersion devices may comprise one or more further dispersion devices, i.e. three or more dispersion devices, each may be associated with a specific user.

The set of dispersion devices may allow each user to have their own dispersion device which they can couple to the shower. The dispersion devices within the set may be the same as each other, but each associated with only one user. This may provide improved hygiene.

In other embodiments, the dispersion devices in the set may differ from each other according to the needs of each associated user. For example, they may be arranged to provide a different water spray (e.g. they may provide a different spray pattern).

The dispersion devices in the set may additionally or alternative have different visual appearance to each other so that they can be customized to the requirements of each associated user, or can be chosen between by a single user to change the appearance of the shower.

A flow dispersion device 1 is shown schematically in FIG. 1. The flow dispersion device 1 is shown coupled to an ablutionary fitting. In the described embodiment, the ablutionary fitting is a shower system having a shower head 2. The shower head 2 is incorporated into a handset 3 (only part is shown). The handset 3 may be connected to a hose or other water supply system (not shown), and may be held above a bath or shower tray (not shown).

In the described embodiment the dispersion device 1 is removably coupled to the shower head 2 of a shower system. However, it will be appreciated that in other embodiments the dispersion device may be removably coupled to any other type of ablutionary fitting which provides a stream of water. This may include a tap, mixer tap, bidet, pull out sprays for showers or sinks (including kitchen sinks).

The shower head 2 comprises an outlet 4 which provides a stream of water. The outlet 4 may be fed by a conduit 5 which runs through the body of the shower head 2 and handset 3. The conduit 5 may carry a supply of water having a temperature and flow rate set by any suitable means such as a mixer valve or a pump.

In the example shown in FIG. 1, the outlet is formed by a single nozzle 6. In other embodiments, the outlet may be formed from one or more separate nozzles each fluidly coupled to the conduit 5. In other embodiments, the nozzles may each have an independently controllable water supply (e.g. supplied by a plurality of separate conduits).

The flow dispersion device 1 comprises a coupling mechanism 7 arranged to removably couple the flow dispersion device 1 to the shower head 2. In the described embodiment, the coupling mechanism 7 is formed by a two part bayonet fitting. In other embodiments, any other suitable coupling mechanism can be provided that allows the user to decouple and recouple the dispersion device 1 (e.g. so that it can be replaced with a different dispersion device). The coupling mechanism may, for example, be a screw coupling, a snap fit coupling, a push fit coupling or a friction fit coupling or the like.

The coupling mechanism may be manually operated by the user. This may allow the user to replace the dispersion device with an alternative dispersion device or remove and replace it for cleaning without the use of tools In the described embodiment, the shower head 2 comprises a holder 7*a* which is arranged to receive the dispersion device 1. In this embodiment, the dispersion device 1 removably couples to the holder 7*a* via the coupling mechanism 7. The nozzle 6 may be formed in the holder 7*a* so that water may flow from the conduit 5 towards the dispersion device 1 when it is coupled to the holder 7*a*. In other embodiments, the holder 7*a* may not be provided, and the dispersion device 1 may instead be removably coupled directly to the body of the shower head 2.

Figure 2A:
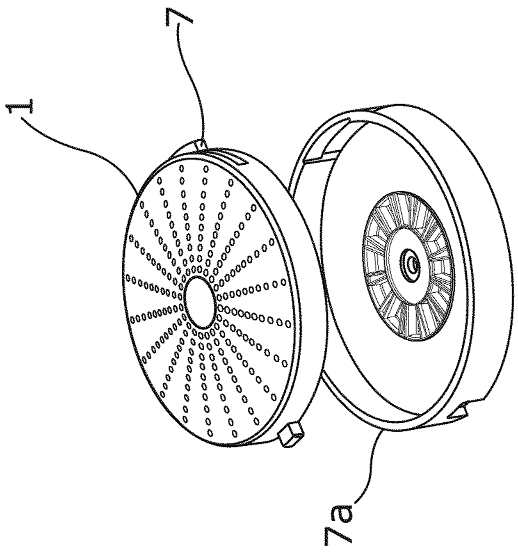
FIGS. 2*a*, 2*b* and 2*c* show a flow dispersion device being removably coupled to a flow dispersion device holder according to an embodiment.
Figure 2B:
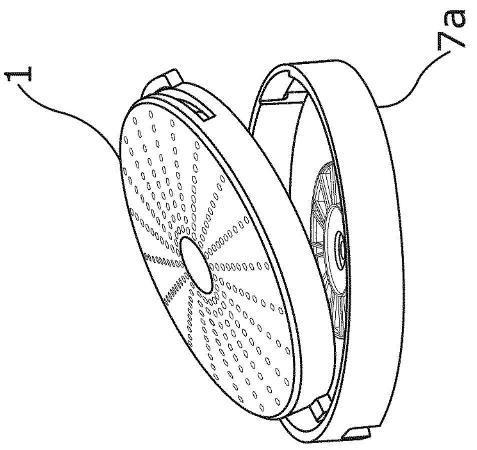
Figure 2C:
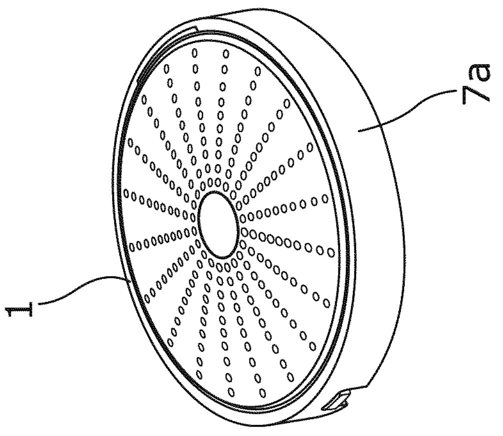

The process of coupling the dispersion device 1 to the holder 7*a* via the coupling mechanism 7 is shown in sequence of FIGS. 2*a*, 2*b* and 2*c*. In this embodiment, the dispersion device 1 is formed from a cylindrical housing (e.g. forming a puck shape). The holder 7 forms a corresponding cylindrical aperture arranged to receive the dispersion device 1.

The embodiment shown in FIGS. 2*a-c* is to be understood as only one example. In other embodiments, the dispersion device may be any other suitable shape and have any other suitable arrangement of coupling mechanism. The holder 7*a* may be shaped according to the shape of the dispersion device 1.

The flow dispersion device 1 is adapted such that, when coupled, it is arranged to disperse the water stream provided from the outlet 4. The water stream is dispersed into a water spray as shown by the arrows in FIG. 1.

In the described embodiment, the dispersion device 1 comprises a front plate 8 having one or more through passages (six of which are shown in FIG. 1) through which water from the water stream may flow. The through passages may form a spray pattern by breaking up the water stream leaving the outlet 4. The dispersion device 1 may have any suitable number of through passages having the same or a mixture of different sizes arranged in a layout suitable to form the desired spray pattern. In other embodiments, the dispersion device 1 may comprise one or more meshes arranged to disperse the water stream to form a spray pattern, or any other suitable structure to disperse the water of the water stream.

The through passages may be incorporated into a dispersion member forming part of the dispersion device. In other embodiments, the dispersion member may be detachable from the dispersion device. This may allow dispersion members to be interchanged to allow the dispersion device to provide different spray patterns.

The dispersion device 1 further comprises a data storage medium 9. The data storage medium 9 is arranged to carry computer readable information defining one or more spray characteristics. The spray characteristics may define one or more desired properties of the water spray to be provided by the ablutionary fitting. The properties of the water spray may be varied according to the spray characteristics to provide a desired user experience.

By providing the data storage medium on the dispersion device 1 the spray pattern provided by the through holes or mesh of the dispersion device may be tailored to the one or more spray characteristics.

The data storage medium 9 is readable by the ablutionary fitting to control the water spray according to the one or more stored spray characteristics. The data storage medium 9 is read by a reader 10 provided on the ablutionary fitting. Once obtained by the reader, the spray characteristics may be communicated to a controller (not shown in the Figures) arranged to control the water spray.

The data storage medium 9 may comprise an electronic data storage medium arranged to electronically store the one or more spray characteristics. In the case of a shower, this may allow a complex showering experience to be stored and conveniently communicated to the shower controller by coupling the dispersion device 1 to the shower head 2.

The data storage medium 9 may communicate with the reader 10 provided on the ablutionary fitting by a wireless connection when the dispersion device 1 is coupled to the ablutionary fitting (i.e. it is in a coupled position). This may avoid the need to create any electrical connection between the data storage medium 9 and the reader 10. This may reduce the number of electrical components provided in or coupled to the shower head.

The data storage medium 9 may, for example, comprise a near field communication (NFC) chip that may be read by a NFC reader provided on the ablutionary fitting. In this embodiment, the data storage medium mounted to the dispersion device 1 may be brought into reading range of the reader 10 when it is coupled to the ablutionary fitting. In some embodiments, the NFC chip may comprise a Radio Frequency Identification (RFID) tag arranged to store one or more spray characteristics.

Figure 3:
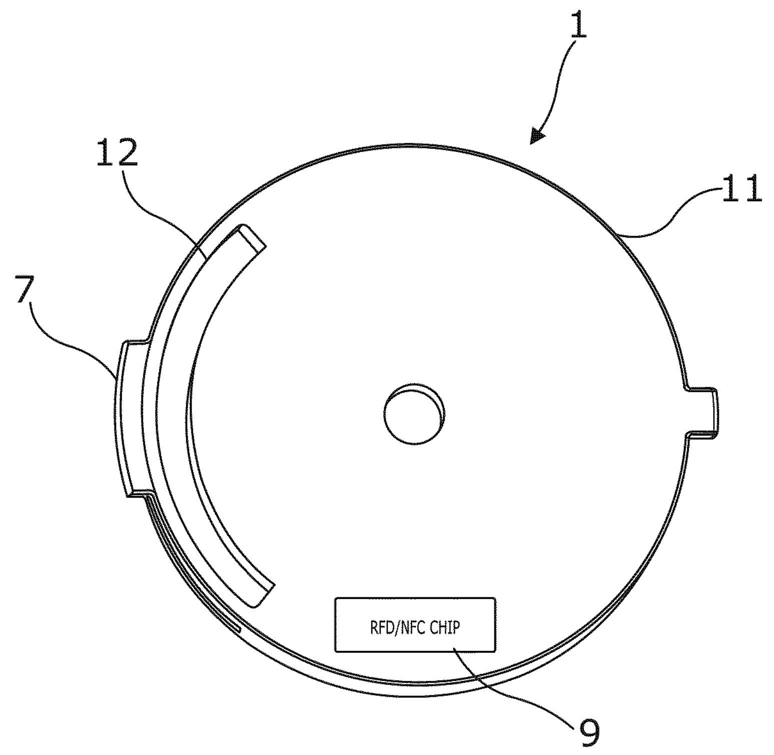
FIG. 3 shows a plan view of the flow dispersion device shown in FIGS. 2*a*, 2*b* and 2*c*.
Figure 4:
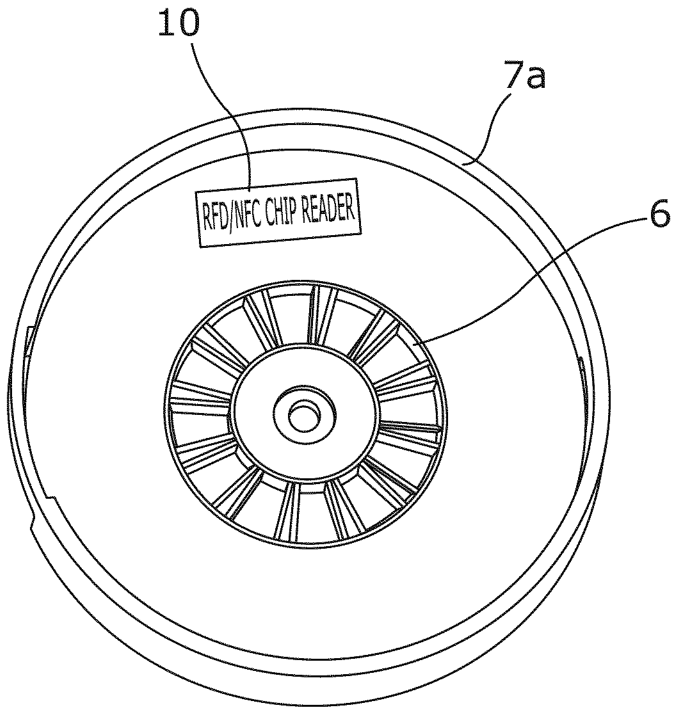
FIG. 4 shows a plan view of the dispersion device holder a shown in FIGS. 2*a*, 2*b* and 2*c*.

An embodiment in which the data storage medium 9 comprises an NFC chip is shown in FIGS. 3 and 4. FIG. 3 shows an NFC chip attached to the dispersion device 1. In this embodiment, the dispersion device comprises a front plate (not visible in FIG. 3) comprising through holes to disperse the water jet as described above. The dispersion device further comprises a back plate 11 on which the data storage medium 9 may be mounted. This may allow it to come into reading distance (or direct electrical contact if required) with the reader 10 mounted to the holder 7*a* (as shown in FIG. 4).

The embodiment shown in FIG. 3 is only one example, in other embodiments the data storage medium and reader may be located in any other suitable position such that they can communicate with each other once the dispersion device 1 has been coupled to the ablutionary fitting.

In the embodiment shown in FIG. 3, the back plate 11 comprises a through passage 12 arranged to receive water from the outlet 4. The through passage provided on the back plate may be fluidly coupled to the through passages (or mesh) on the front plate of the dispersion device to allow the water stream provided by the outlet 5 to be dispersed into a spray. In other embodiments, the back plate 11 and through passage 12 may be absent. In such an embodiment, the water stream may be directed straight from the nozzle 6 to the front plate where the water stream is dispersed. In this case the data storage medium may be attached to another part of the dispersion device 1 (e.g. the back surface of the front plate).

In some embodiments, the data storage medium may comprise a passive data storage device which may be wirelessly powered by the reader 10. This may mean that a power source does not need to be provided on the dispersion device 1. This may reduce the amount of electronic circuitry provided on the dispersion device that could come into contact with water.

In other embodiments, the data storage medium 9 may communicate with the reader 10 provided on the ablutionary fitting by an electrical contact between them. In this embodiment, the data storage medium 9 may comprise any suitable computer readable memory such as RAM, flash memory, magnetic or optical drives etc. A wired electrical contact may be formed between the data storage medium 9 and the reader 10 when the dispersion device 1 is moved into a coupled position on the ablutionary fitting.

In yet other embodiments, the data storage medium 9 may comprise a computer readable optical label. In such an embodiment, the reader 10 provided on the ablutionary fitting may be an optical reader arranged to scan the optical label. The optical label may, for example, comprise a barcode or QR code that is readable when the dispersion device 1 is coupled to the ablutionary fitting. When the dispersion device 1 is coupled to the ablution fitting the optical reader and optical label may be aligned such that the label may be read and the stored spray characteristic(s) obtained.

In some embodiments, the data storage medium 9 may be pre-loaded with one or more spray characteristics corresponding to a certain user experience. For example, the data storage medium may be pre-loaded with one or more spray characteristics corresponding to a particular shower experience such as a gentle morning wake up experience or a vigorous sport warm down experience. This may allow the user to conveniently program the ablutionary fitting to provide the desired user experience.

A set of two or more dispersion devices 1 may be provided, each with a different pre-loaded spray characteristic or characteristics for the user to choose between by coupling the appropriate dispersion device from the set to the ablutionary fitting.

The different dispersion devices in the set may be arranged to disperse the water flow into different water spray patterns. This may be achieved by having different arrangements of through holes or different shapes or patterned meshes in the dispersion device 1. The spray characteristic(s) stored on each dispersion device may correspond to the spray pattern provided by that particular dispersion device. In other embodiments, only the spray characteristics stored on the data storage medium of each dispersion device 1 of the set may vary.

The data storage medium 9 may be programmable by the user to define the stored spray characteristic. This may allow a greater level of user customizability by allowing them to define the one or more spray characteristics they require from the ablutionary fitting to create the desired user experience. The user may, for example, program the data storage medium to store a desired spray characteristic or sequence of spray characteristics. This may be achieved using a suitable device for reading and writing information to the data storage medium. In the case of an NFC chip, the user may program the data storage medium 9 using a smart phone or the like.

The one or more spray characteristics stored by the data storage medium 9 may provide information on the desired properties of the water spray provided by the ablutionary fitting. The properties of the water spray may include any one or more of i) the temperature of at least part of the water making up the water spray; ii) the flow rate of at least part of the water making up the water spray; and iii) the spray pattern of at least part of the water spray.

By "pattern" of the water spray we mean the spatial geometry of the water spray created by the dispersion device. The pattern of the water spray may, for example, be varied between a narrow focused jet and a wide diverging water spray.

The spray characteristics may be arranged to define a time dependent change in the properties of the water spray. The spray characteristic(s) may define a sequence of varying water spray properties such that combinations of any one of the water temperature, water flow rate and spray pattern may be varied over time to create different user experiences. This may allow complex user experiences to be generated by the stored spray characteristics.

As described above, a controller of the ablutionary fitting may receive the spray characteristics from the reader. The controller may be in communication with any one or more components of the ablutionary fitting which may be operable to change the properties of the spray provided by the dispersion device. These components may include a water source supplying water to the conduit (e.g. a mixer valve), the nozzle 6 (or nozzles) forming the outlet, or the configuration or position of the dispersion device 1 itself. Examples of different ways the controller may control the water spray in response to various different spray characteristics are described as follows:

The spray characteristic may define the temperature of the water spray leaving the dispersion device 1. In some embodiments, the spray characteristic may define the temperature of all of the water making up the water spray (e.g. a uniform temperature may be provided across the water spray). In this embodiment, the temperature of the water supplied by the conduit 5 to the outlet 4 may be controlled in response to a temperature value set by the spray characteristic. The temperature of the water may be controlled by controlling a water heater or mixer valve arranged to adjust the temperature of the water supplied to the outlet.

The spray characteristic may define the flow rate of the water spray leaving the dispersion device 1. In some embodiments, the spray characteristic may define the flow rate of all of the water making up the water spray such that it is uniform across the water spray. This may be achieved by controlling the flow rate of the water supplied by the conduit 5 to the outlet 4 in response to a flow rate value set by the spray characteristic.

The flow rate of the water may be controlled by controlling a valve or pump via which water is supplied to the conduit 5. In other embodiments, the flow of water from the dispersion device may be controlled by a change in orientation or configuration of the dispersion device.

For example, the dispersion device may be rotated between a first position in which a first set of through passages providing water at a first flow rate are fluidly coupled to the nozzle 6 and a second position in which a second set of through passages providing a water at a second flow rate are fluidly coupled to the nozzle 6.

In yet other embodiments, the nozzle 6 (or nozzles if more than one forms the outlet) may be controlled to adjust the flow rate. The nozzle(s) 6 may form a valve arranged to restrict the rate of flow of water leaving the conduit and being supplied to the dispersion device 1.

The spray characteristic may define a spray pattern of the water spray. The pattern of the water spray may be varied in response to the stored characteristic by adjusting the orientation or configuration of the dispersion device 1.

In some embodiments, the relative spacing between the dispersion device and the nozzle 6 may be adjusted to change the level of divergence or focusing of the water spray. In embodiments where the dispersion device 1 comprises a mesh, the mesh may be rotated relative to the nozzle to provide a variation in spray pattern.

The dispersion device 1 may be coupled to a suitable actuator (not shown in the Figures) arranged to provide a change in its position or orientation in response to the spray characteristics received from the data storage medium 9.

In some embodiments, the one or more spray characteristics may define more complex variations of the water forming the water spray. The flow rate or temperature of the water making up different parts of the water spray may be varied across the water spray as defined by the stored spray characteristics.

For example, in some embodiments, the outlet 5 may comprise two or more separate nozzles, each supplied by an independent conduit. The separate nozzles may provide water to different parts of the dispersion device 1, thus creating parts of the water spray having different temperatures or flow rates.

In this embodiment, the spray characteristics may define the temperature or flow rate of water supplied by different parts of the dispersion device 1. This may be achieved by controlling the water supplied by each of the nozzles either by controlling the water supplied by each of the separate conduits or controlling the nozzles themselves.

In the described embodiment, the ablutionary fitting comprises only one water outlet 4 providing a water stream which is dispersed by the dispersion device 1. In the case of a shower, the shower may have a single shower head. In other embodiments, the ablutionary fitting may have two or more outlets each providing respective water streams (e.g. a shower having multiple shower heads). In this embodiment, the flow characteristic(s) may define the properties of water sprays provided from each of the outlets.

Only one of the outlets may need to be provided with a removably coupled dispersion device 1 as described herein. The spray characteristics stored by that dispersion device may however control water provided from each of the other water outlets provided. In some embodiments, each of the outlets may be provided with a removably coupled dispersion device.

The embodiments of the dispersion device described above each include a data storage medium. In other embodiments, the data storage medium may not be included.

In another aspect, the flow dispersion device comprises a coupling mechanism arranged to removably couple the flow dispersion device to the ablutionary fitting such that, when coupled, the flow dispersion device is arranged to disperse the water stream from the ablutionary fitting into a water spray.

This may allow the dispersion device to be easily removed and replaced, or removed and replaced by an alternative dispersion device. This may allow the dispersion device to be removed for ease of cleaning, or allow it to be replaced by a different dispersion device associated with a different user.

The coupling mechanism may be manually operated by the user. This may allow the user to replace the dispersion device with an alternative dispersion device or remove and replace it for cleaning without the use of tools. The coupling mechanism may be any suitable mechanism arranged for manual operation by the user. It may, for example, be a screw, bayonet, push fit or snap it connection.

A set of dispersion devices may be provided. In some embodiments, the set may comprise a first dispersion device (e.g. associated with a first user) and a second dispersion device (e.g. associated with a second user). In some embodiments, the set may comprise further dispersion members according to the number of users. In other embodiments, all of the dispersion devices in the set may be associated with a single user.

The set of dispersion devices may allow each user to have their own dispersion device which they can couple to the shower. In some embodiments, the dispersion devices within the set may be the same as each other, but associated with only one user. This may provide improved hygiene by allowing each user to use their own dedicated dispersion device.

In other embodiments, the dispersion devices in the set may differ from each other according to the needs of each associated user or to allow a single user to choose a desired dispersion device from the set. For example, the dispersion devices may be arranged to provide different water sprays (e.g. they may provide a different spray pattern by having a different arrangement of through holes or other means to shape the water spray as described above).

The dispersion devices in the set may additionally or alternative have a different visual appearance to each other so that they can be customized to user requirements. This may allow the user to choose a desired dispersion device, or allow different users to have their own visually customized dispersion device.

In some embodiments, the different spray pattern and different visual appearance may be provided together or provided separately.

Features mentioned above in connection with embodiments without a data storage medium may be used in combination with the embodiments which do include a data storage medium.

What is claimed is:

1. An apparatus, the apparatus including:

a shower head providing a water stream;

a flow dispersion device for use with the shower head, the flow dispersion device comprising:

a holder configured to receive the flow dispersion device;

a data storage medium arranged to store computer readable information defining one or more spray characteristics, wherein the holder receives the data storage medium;

wherein the flow dispersion device is removably coupled to the shower head such that the flow dispersion device is arranged to disperse the water stream into a water spray;

wherein a maximum diameter of the flow dispersion device is smaller than a maximum diameter of the shower head;

wherein the data storage medium is readable by the shower head to control the water spray according to the one or more stored spray characteristics;

wherein the data storage medium communicates with a reader provided on the apparatus; and wherein the one or more spray characteristics define at least a spray pattern of at least part of the water spray.

2. The flow dispersion device of claim 1, wherein the data storage medium is arranged to communicate with a reader provided on the shower head.

3. The flow dispersion device of claim 2, wherein the data storage medium is arranged to form a wireless connection with the reader.

4. The flow dispersion device of claim 3, wherein the data storage medium is positioned on the dispersion device such that the wireless connection is formed when the dispersion device is coupled to the shower head.

5. The flow dispersion device of claim 1, wherein the data storage medium comprises an electronic data storage medium arranged to electronically store the one or more spray characteristics.

6. The flow dispersion device of claim 5, wherein the data storage medium comprises a near field communication (NFC) chip and is readable by an associated NFC reader provided on the shower head.

7. The flow dispersion device of claim 6, wherein the NFC chip comprises a Radio Frequency Identification (RFID) tag.

8. The flow dispersion device of claim 5, wherein the data storage medium comprises a passive data storage device.

9. The flow dispersion device of claim 2, wherein the data storage medium comprises a computer readable optical label and the reader comprises an optical reader arranged to read the optical label.

10. The flow dispersion device of claim 1, wherein the one or more spray characteristics each define one or more desired properties of the water spray to define a desired user experience.

11. The flow dispersion device of claim 10, wherein the data storage medium is pre-loaded with one or more spray characteristics corresponding to a certain pre-defined user experience.

12. The flow dispersion device of claim 10, wherein the data storage medium is programmable by the user to define the one or more spray characteristics such that they correspond to a desired user experience.

13. The flow dispersion device of claim 1, wherein the one or more spray characteristics define a time dependent change in a property of the water spray.

14. The flow dispersion device of claim 13, wherein the one or more spray characteristics define a sequence of varying water spray properties such that combinations of any one or more of a water temperature, a water flow rate, or a spray pattern may be varied over time to create different user experiences.

15. The flow dispersion device of claim 1, wherein the shower head comprises a controller arranged to receive the one or more spray characteristics, the controller being in communication with one or more components of the shower head operable to change the properties of the water spray.

16. The flow dispersion device of claim 15, wherein the components operable to change the properties of the water spray include any one or more of:

i) a water source supplying water to the shower head;

ii) one or more nozzles provided at the shower head; or iii) the dispersion device.

17. The flow dispersion device of claim 1, wherein the flow dispersion device includes a first side connected to the shower head and a second side including two or more holes for directing the water stream from the flow dispersion device, wherein the first side and the second side are substantially parallel to one another.

18. An ablutionary fitting comprising the flow dispersion device of claim 1, the ablutionary fitting further comprising:

an outlet arranged to provide a stream of water;

a data storage medium arranged to store computer readable information defining one or more spray characteristics;

a reader arranged to read the computer readable information stored by the data storage medium;

a controller in communication with the reader, the controller arranged to control the water spray formed by the flow dispersion device according to the one or more stored spray characteristics; and wherein the ablutionary fitting is removably coupled to the flow dispersion device.

19. The flow dispersion device of claim 2, wherein the data storage medium is coupled to the flow dispersion device such that the data storage medium is within a reader range of the reader when the flow dispersion device is coupled to the shower head.

20. The flow dispersion device of claim 1, wherein the one or more spray characteristics also define a flow rate of at least part of the water making up the water spray.

* * * * *